US009620917B1

(12) United States Patent
Wronski et al.

(10) Patent No.: US 9,620,917 B1
(45) Date of Patent: *Apr. 11, 2017

(54) ROTATABLE WIRE TERMINATION FACILITY

(71) Applicant: Cooper Technologies Company, Houston, TX (US)

(72) Inventors: Grzegorz Wronski, Peachtree City, GA (US); Zhihong Lin, Shanghai (CN); Michael Troy Winslett, Fairburn, GA (US); Jyoti Gururaj Kathawate, Smyrna, GA (US); Oliver Ernst, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,949

(22) Filed: Jul. 11, 2016

Related U.S. Application Data

(63) Continuation of application No. 14/808,924, filed on Jul. 24, 2015, now Pat. No. 9,391,416.

(60) Provisional application No. 62/028,456, filed on Jul. 24, 2014, provisional application No. 62/036,288, filed on Aug. 12, 2014.

(51) Int. Cl.
| | |
|---|---|
| *H01R 13/44* | (2006.01) |
| *H01R 35/04* | (2006.01) |
| *H01R 9/24* | (2006.01) |
| *H01R 13/74* | (2006.01) |
| *H02G 3/08* | (2006.01) |
| *H02G 3/20* | (2006.01) |
| *H04Q 1/02* | (2006.01) |

(52) U.S. Cl.
CPC ............... *H01R 35/04* (2013.01); *H01R 9/24* (2013.01); *H01R 13/74* (2013.01); *H02G 3/081* (2013.01); *H02G 3/086* (2013.01); *H02G 3/20* (2013.01); *H04Q 1/131* (2013.01); *H04Q 2201/08* (2013.01); *Y10S 248/906* (2013.01)

(58) Field of Classification Search
CPC . H04Q 1/131; H04Q 2201/08; Y10S 248/906
USPC ....................................... 439/131, 521, 901
See application file for complete search history.

(56) References Cited

U.S. PATENT DOCUMENTS

| | | |
|---|---|---|
| 3,904,936 A | 9/1975 | Hamrick |
| 6,227,885 B1 | 5/2001 | Raviv |
| 6,788,786 B1 | 9/2004 | Kessler |
| 8,093,496 B2 | 1/2012 | Keith |
| 9,391,416 B1 * | 7/2016 | Wronski ............... H04Q 1/021 |

(Continued)

OTHER PUBLICATIONS

WAGO. Hazardous Location: Products and Applications. Brochure pp. 1-48. Mar. 2014. www.wago.com.

*Primary Examiner* — Tho D Ta
(74) *Attorney, Agent, or Firm* — King & Spalding LLP

(57) ABSTRACT

An electrical device can have an associated wiring box for connecting the electrical device to an external electrical supply, for example to utility power. The wiring box can include an opening suitable for worker access, so that a worker can connect or disconnect the electrical device from electrical power. Wiring connectors can be rotatably mounted in the wiring box for making the electrical connection. The wiring connectors can be rotated to one orientation to enhance worker access through the opening, for example during installation, and to another orientation for long-term operation.

20 Claims, 10 Drawing Sheets

(56) References Cited

U.S. PATENT DOCUMENTS

| | | |
|---|---|---|
| 2003/0054680 A1 | 3/2003 | Ross |
| 2009/0277681 A1 | 11/2009 | Musolf |
| 2010/0124849 A1 | 5/2010 | Winstanley |
| 2011/0117760 A1 | 5/2011 | Winstanley |

* cited by examiner

ROTATABLE WIRE TERMINATION FACILITY

CROSS REFERENCE TO RELATED APPLICATIONS

The present application is a continuation application of and claims priority to U.S. Non-Provisional patent application Ser. No. 14/808,924, titled "Rotatable Wire Termination Facility," and filed on Jul. 24, 2015; which claims priority to U.S. Provisional Patent Application No. 62/028,456, filed Jul. 24, 2014 in the name of Grzegorz Wronski, Zhihong Lin, Michael Troy Winslett, and Jyoti Gururaj Kathawate and titled "Rotatable Wire Termination Facility;" and claims priority to U.S. Provisional Patent Application No. 62/036,288, filed Aug. 12, 2014 in the name of Grzegorz Wronski, Zhihong Lin, Michael Troy Winslett, and Jyoti Gururaj Kathawate and titled "Rotatable Wire Termination Facility". The entire contents of each of the foregoing applications are hereby incorporated herein by reference.

TECHNICAL FIELD

Embodiments of the technology relate generally to wiring management, and more particularly to a wiring box incorporating a terminal block or connector assembly that may be rotatable to facilitate access during installation or service.

BACKGROUND

Many electrical devices receive power through a wired connection to an external power source. Electrical devices wired in this manner may include luminaires, transformers, generators, alarm systems, HVAC equipment, fans, telecommunications gear, computers, servers, power distribution, automation, manufacturing control systems, generators, industrial equipment, and consumer devices such as refrigerators and dishwashers, for example. Wiring such electrical devices during installation or service can be tedious or inefficient due to cramped quarters or limited accessibility. For example, when people are installing recessed luminaires using conventional wiring management approaches, they may struggle to make wiring connections as quickly as desired.

Accordingly, there are needs in the art for improved wiring management. For example, need exits for wiring electrical devices to a power source efficiently, such as to utility electrical power. Further need exists for improved wiring terminals. A capability addressing one or more such needs, or some other related deficiency in the art, would support improved installation and service of electrical systems.

SUMMARY

A wiring box can supply electricity to an electrical device and can have an opening suitable for worker access. A wiring connector assembly can be mounted in the wiring box. The mounted wiring connector assembly can either rotate about an axis or be mounted in a permanently fixed position. Whether rotatable or fixed, the mounted wiring connector assembly can enhance usability and termination efficiency. When the mounted wiring connector is rotatable, a worker can turn the assembly during a wiring procedure to enhance connector access through the wiring box opening.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1:
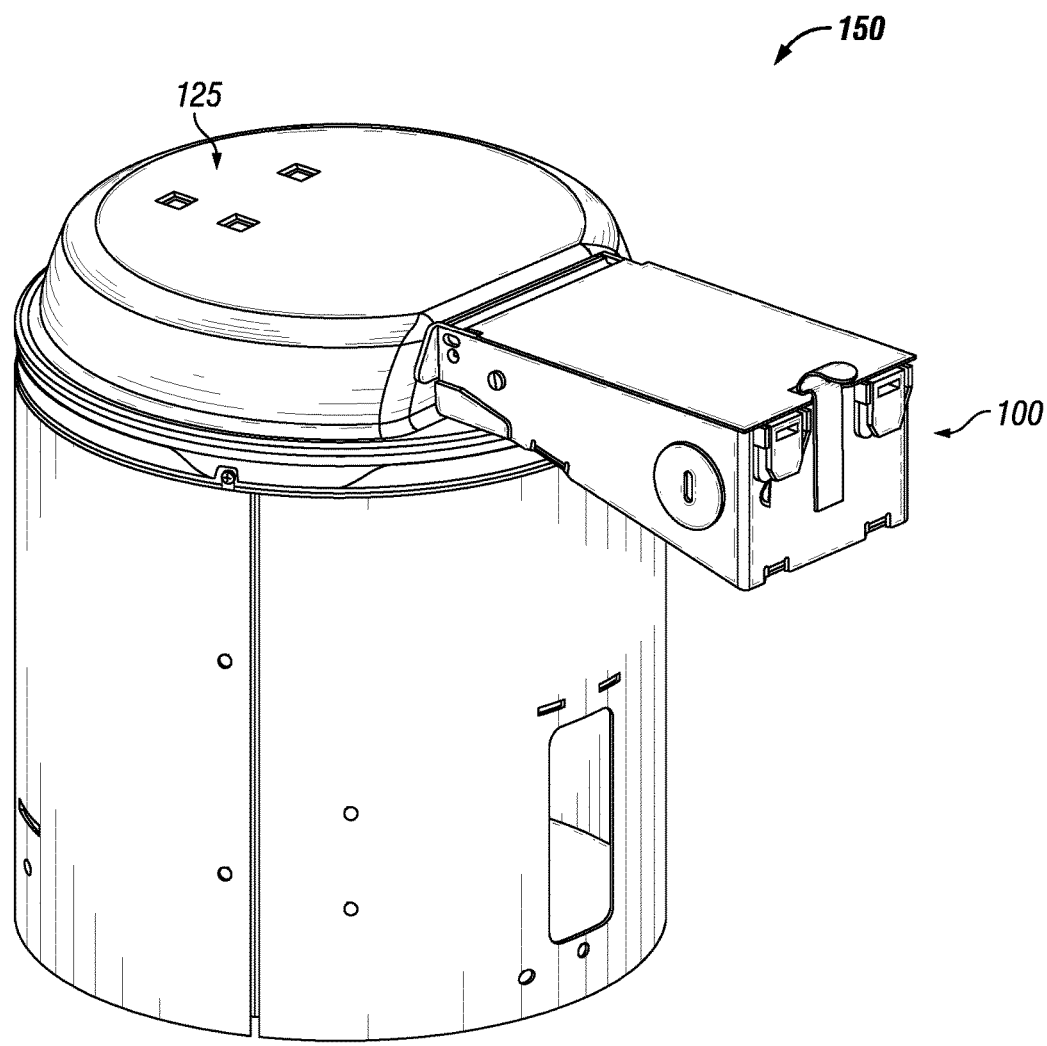
FIG. 1 illustrates a system comprising a luminaire and an example associated wiring box according to some embodiments of the disclosure.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DESCRIPTION OF EXAMPLE EMBODIMENTS

Some representative embodiments will be described hereinafter with example reference to the accompanying drawings. FIG. 1 describes a representative operating environment for the technology, specifically a luminaire with a wiring box in which a representative embodiment of a connector assembly is mounted. The connector assembly can be mounted in a permanently fixed position or rotatably mounted. FIGS. 2, 3, 4 and 5 describe a representative wiring box with representative rotatable wiring facilities.

The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

For example, while the figures illustrate a luminaire application, the technology and the present disclosure support many other applications. The present technology may be utilized in a wide variety of applications, including for wire management in connection with wiring transformers, generators, alarm systems, HVAC equipment, fans, telecommunications gear, computers, servers, power distribution, automation, manufacturing control systems, generators, industrial equipment, and consumer devices such as refrigerators and dishwashers, to mention a few representative examples without limitation.

Turning now to FIG. 1, this figure is an illustration of a system 150 comprising a luminaire 125 and an associated wiring box 100, in accordance with some example embodiments of the disclosure. The illustrated luminaire 125 provides one example embodiment of an electrical device.

Details of an example embodiment of the luminaire 125 are disclosed in U.S. patent application Ser. No. 14/242,535, filed on Apr. 1, 2014 in the names of Wronski, Grzegorz; Lin, Zhihong; Pyshos, Steven Walter; and Kathawate, Jyoti Gururaj and entitled "LUMINAIRE RETENTION" (U.S. Pat. No. 9,086,198 as of Jul. 21, 2015), the entire contents of which are hereby incorporated herein by reference.

While illustrated as attached to the luminaire 125 (specifically to an external portion of the lighting fixture frame), the wiring box 100 may be attached to or otherwise associated with a wide variety of electrical devices that utilize wiring. In some example embodiments, the wiring box 100 is attached to or otherwise associated with a piece of industrial equipment such as a conveyor, robot, oven, control system, pump, turbine, welding machine, etc. In some example embodiments, the wiring box 100 is attached to or otherwise associated with a consumer device such as a washing machine, dishwasher, refrigerator, trash compactor, furnace, heat pump, etc. In some example embodiments, the wiring box 100 is part of an electrical distribution system that may supply power to multiple electrical devices. For example, the wiring box 100 may be deployed in a power utility circuit.

In some example embodiments, the wiring box 100 is separated from the electrical device that the wiring box feeds. For example, the wiring box 100 may be located in one room or area of a facility, and the electrical device located in a different room or area. In such embodiments, wiring may extend a substantial distance between the wiring box and the wired device, for example.

As will be discussed in further detail below, the wiring box 100 comprises wire management technology that can support efficient installation and post-installation service. For example, the wiring box 100 can comprise rotatable connection or termination facilities.

Turning now to FIG. 2, this figure provides illustrations of the wiring box 100 in accordance with some example embodiments of the disclosure. FIG. 2A illustrates a perspective view of the wiring box 100 in a closed configuration. FIG. 2B illustrates a perspective view of the wiring box 100 in an open configuration in which a mounted rotatable connector assembly 225 is rotated away from an opening 207 of the wiring box 100. FIG. 2C illustrates a perspective view of the wiring box 100 in an open configuration in which the rotatable connector assembly 225 is rotated towards the opening 207 of the wiring box 100. FIG. 2D illustrates the wiring box 100 with its cover 205 removed and showing representative internal wiring 260. FIG. 2E illustrates the wiring box 100 with the cover 205 open and showing an intermediate stage of wiring during installation. FIG. 2E illustrates the wiring box 100 with the cover 205 open and showing a later stage of wiring during installation.

Figure 2A:
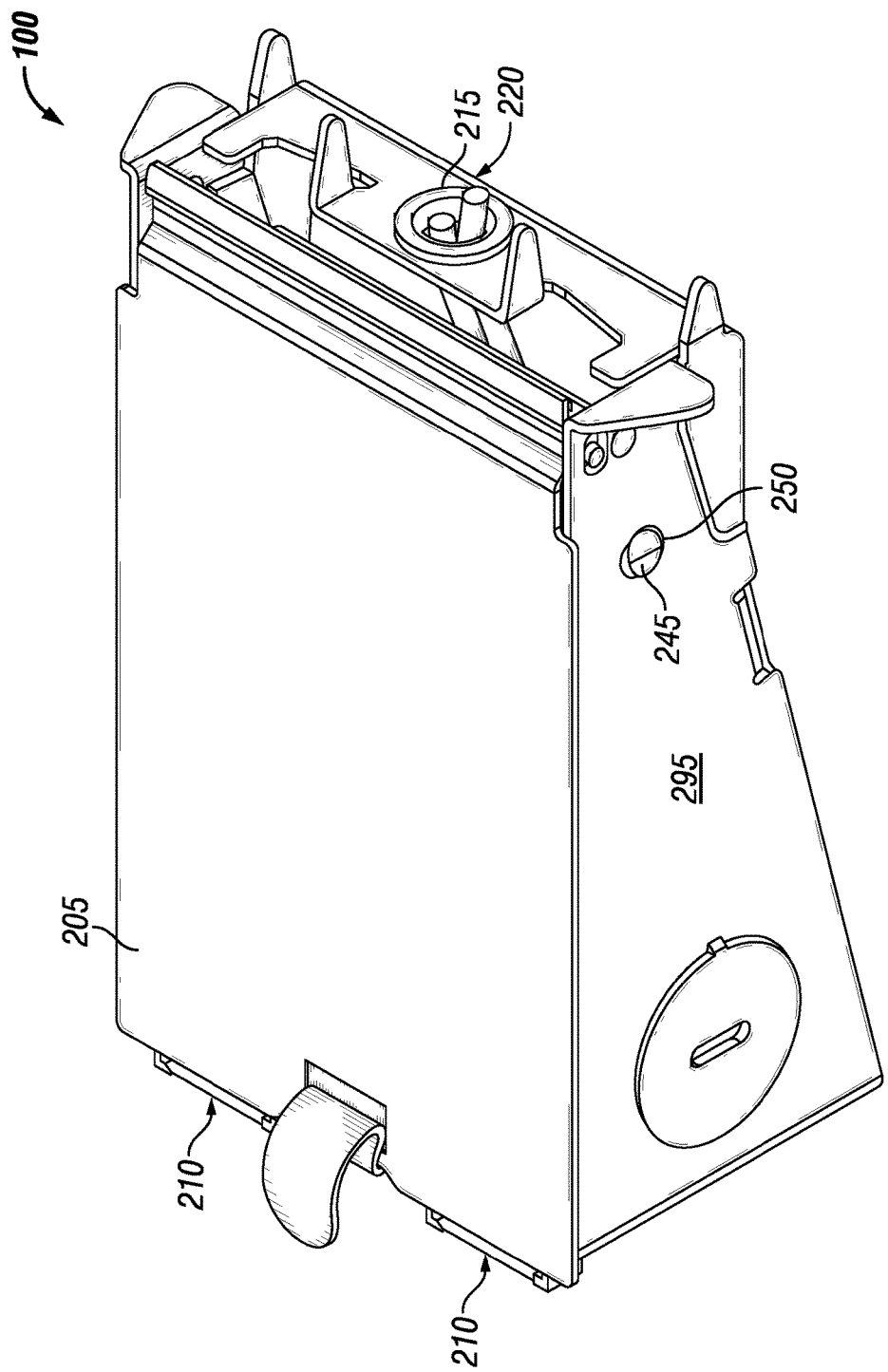
FIGS. 2A, 2B, 2C, 2D, 2E, and 2F (collectively FIG. 2) illustrate multiple views of an example form of a wiring box according to some embodiments of the disclosure.

The view of FIG. 2A shows the end of the wiring box 100 that mounts or couples to the luminaire 150 as shown in FIG. 1 and discussed above. At this end, the wiring box 100 comprises a wiring aperture 215 that is sized to pass output electrical wiring 220 between the wiring box 100 and the luminaire 150 (or other appropriate electrical device). Thus, the wiring box 100 supplies electrical power via the output electrical wiring 220 that extends through the wiring aperture 215. As can be readily seen in FIG. 2F, input electrical wiring 255 feeds the electrical power into the wiring box 100, and the output electrical wiring 220 in turn supplies the luminaire 150.

Figure 2B:
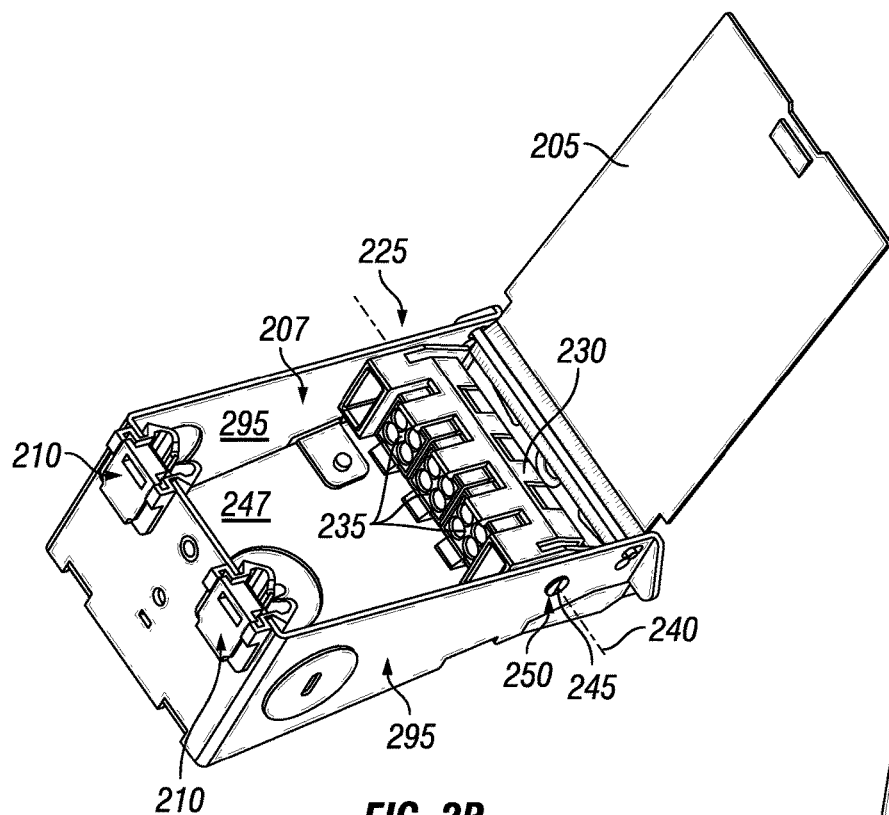
Figure 2C:
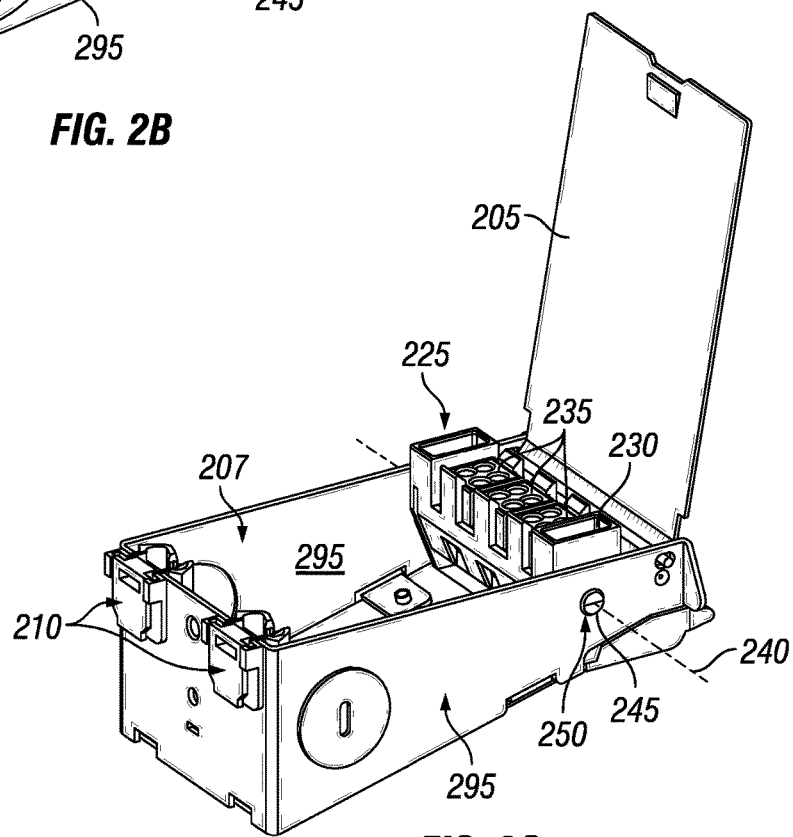

Referring now to FIGS. 2B and 2C, the illustrated wiring box 100 comprises a rotatable connector assembly 225 that extends between opposing sides 295 of the wiring box 100. As illustrated, the rotatable connector assembly 225 is rotatable about an axis of rotation 240 that extends through both of the sides 295 of the wiring box 100.

As will be discussed in further detail below, the illustrated rotatable connector assembly 225 comprises wiring connectors 235 retained in a rotatable connector channel 230. As illustrated, the rotatable connector assembly 225 can be viewed as a mounted terminal block or terminal strip that comprises a connector array and that is rotatable.

FIGS. 2B and 2C illustrate two rotational orientations. In the orientation of FIG. 2B, the rotatable connector assembly 225 is rotated away from the opening 207 of the wiring box 100. This orientation provides the rotatable connector assembly 225 substantial clearance for closing the cover 205 of the wiring box 100 conveniently. The orientation of FIG. 2B is typically the operational orientation that is sustained after installation.

In the orientation of FIG. 2C, the rotatable connector assembly 225 is rotated towards the opening 207 of the wiring box 100. This orientation facilitates access for a worker to make (or disconnect) wiring connections. Once the worker has wired the rotatable connector assembly 225, the worker can rotate the rotatable connector assembly 225 to the orientation of FIG. 2B. In an example embodiment, when the rotatable connector assembly 225 is oriented towards the opening 207 of the wiring box 100 (as illustrated in FIG. 2C), the rotatable connector assembly 225 may interfere with closing of the cover 205 of the wiring box 100. Meanwhile, when the rotatable connector assembly 225 is rotated away from the opening 207 (as illustrated in FIG. 2B), clearance may increase so that the cover 205 is readily closed without interference.

In some embodiments, the rotatable connector assembly 225 can rotate to an unrestricted number of angular orientations. In other embodiments, the rotatable connector assembly 225 has a discrete number of angular orientations, for example two, three, four, or five increments. In some embodiments, the rotatable connector assembly 225 has two discrete settings that are separated by a predetermined angular range, one for wiring as illustrated in FIG. 2C and another for operation as illustrated in FIG. 2B. Thus, in some embodiments, a worker can rotate the rotatable connector assembly 225 to the orientation of FIG. 2C, and the rotatable connector assembly 225 will retain that orientation by spring loading, ratchet, friction, or other appropriate mechanism or mechanical means.

Figure 2D:
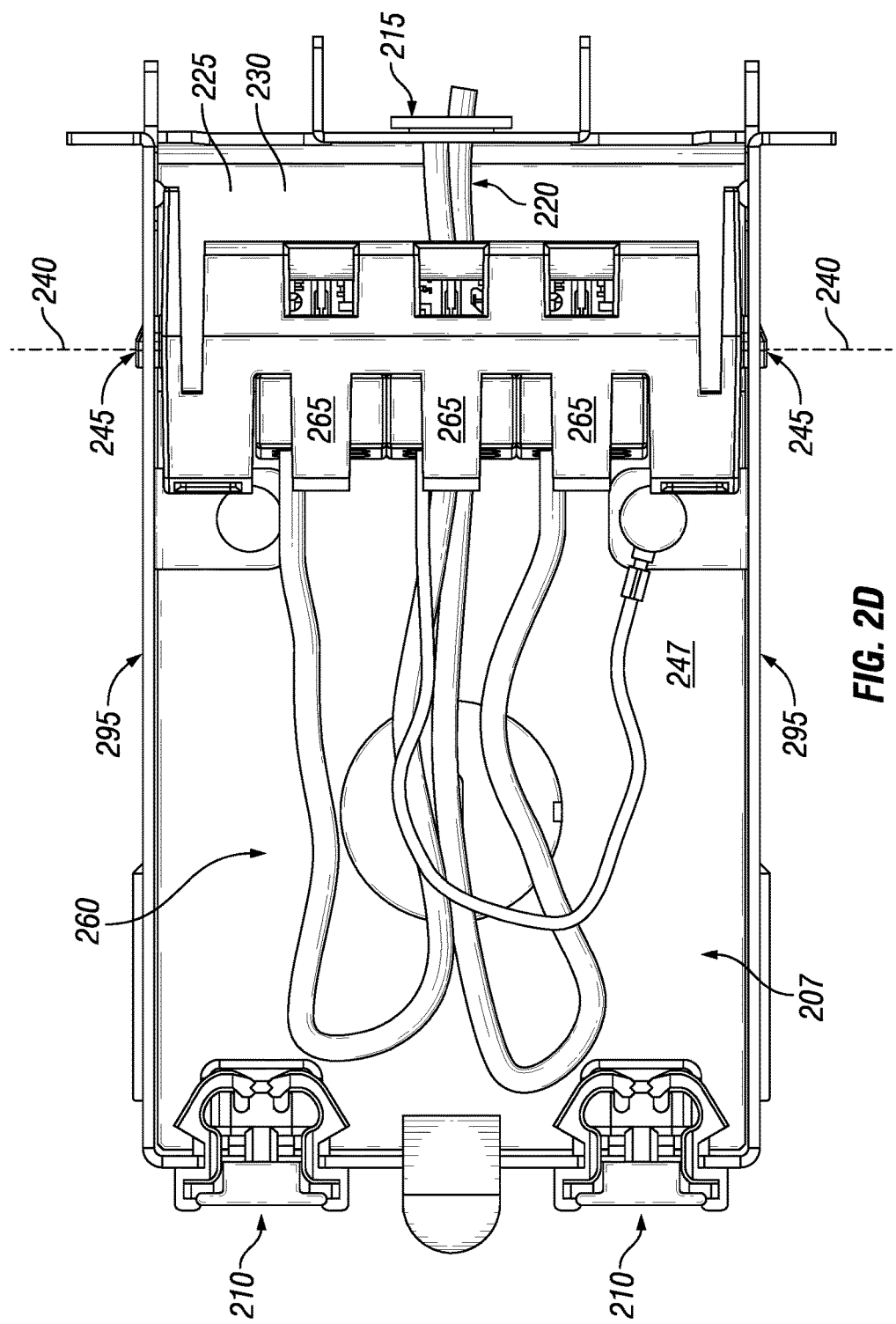

FIG. 2D illustrates example internal wiring 260 for the wiring box 100 (with the wiring box cover 205 removed to promote visibility). In the illustrated embodiment, wiring segments make electrical connections between the wiring connectors 235 along with a ground wire for grounding the wiring box 100. Accordingly, electricity can flow between or among the wiring connectors 235 on a path to exiting the wiring box 100 through the output electrical wiring 220.

FIG. 2D illustrates a representative wiring configuration of the wiring box 100 as may be shipped from a manufacturer to the field for installation.

Figure 2E:
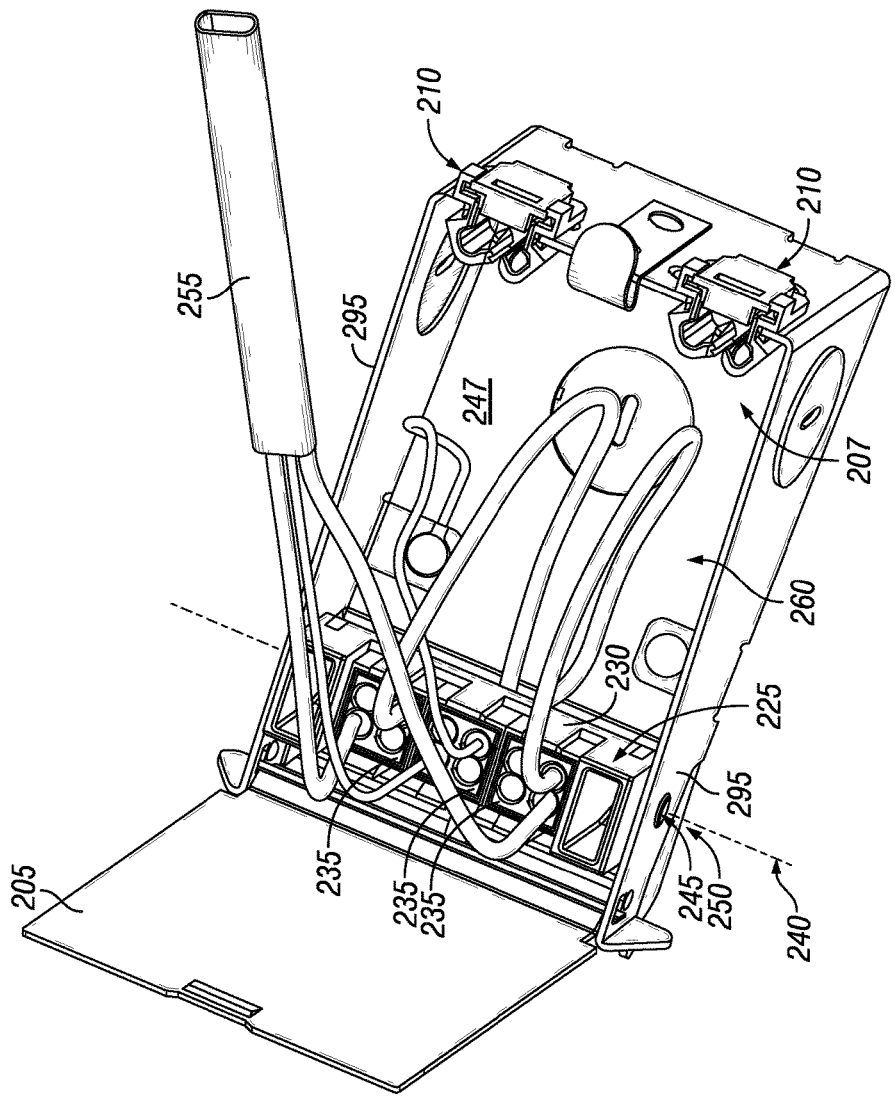

FIG. 2E illustrates an example stage of installation. Here, the rotatable connector assembly 230 is rotated to an orientation that facilitates making field wiring connections. Thus, the wiring connectors 235 can face or be oriented towards the wiring box opening 207 to facilitate access. As illustrated, connections are readily made between the input electrical wiring 255 and the wiring connectors 235.

Figure 2F:
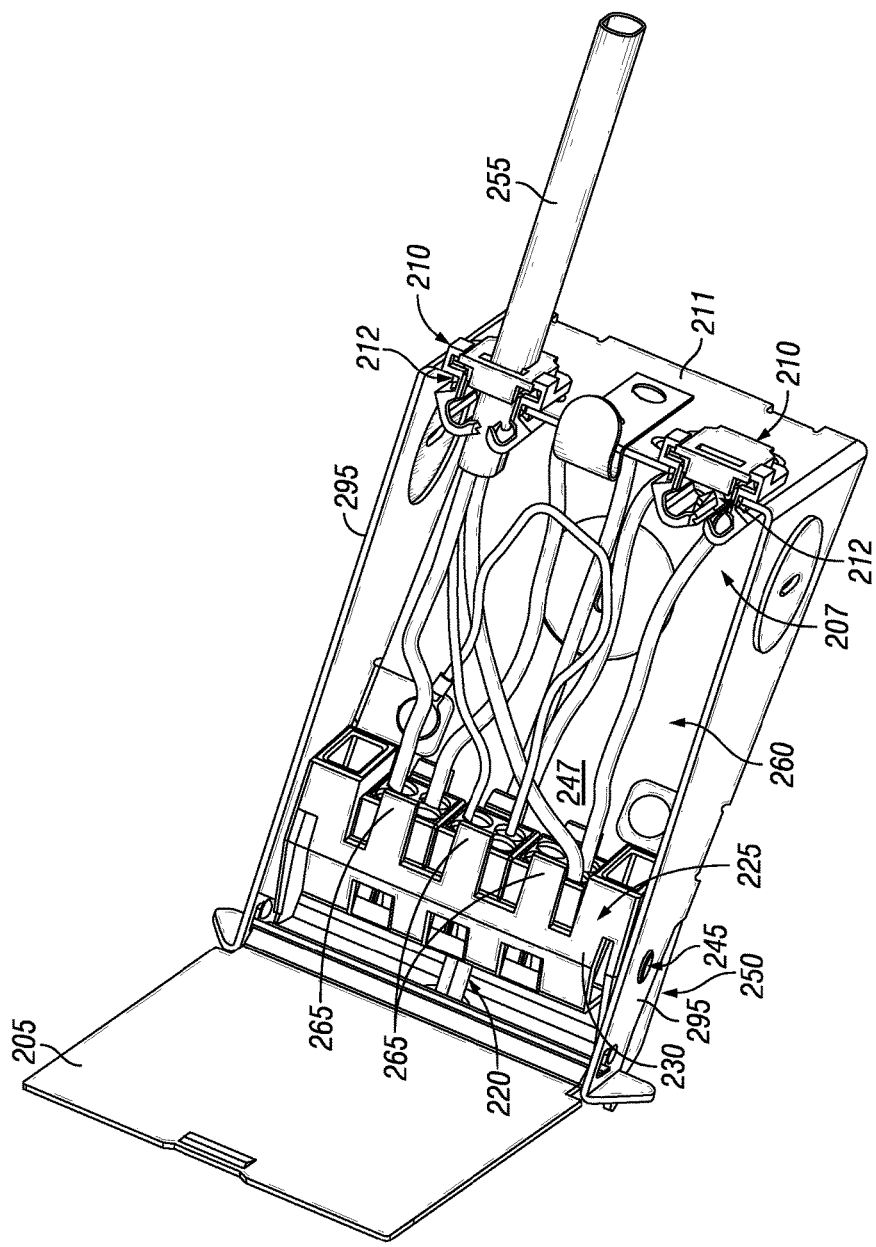
Figure 3A:
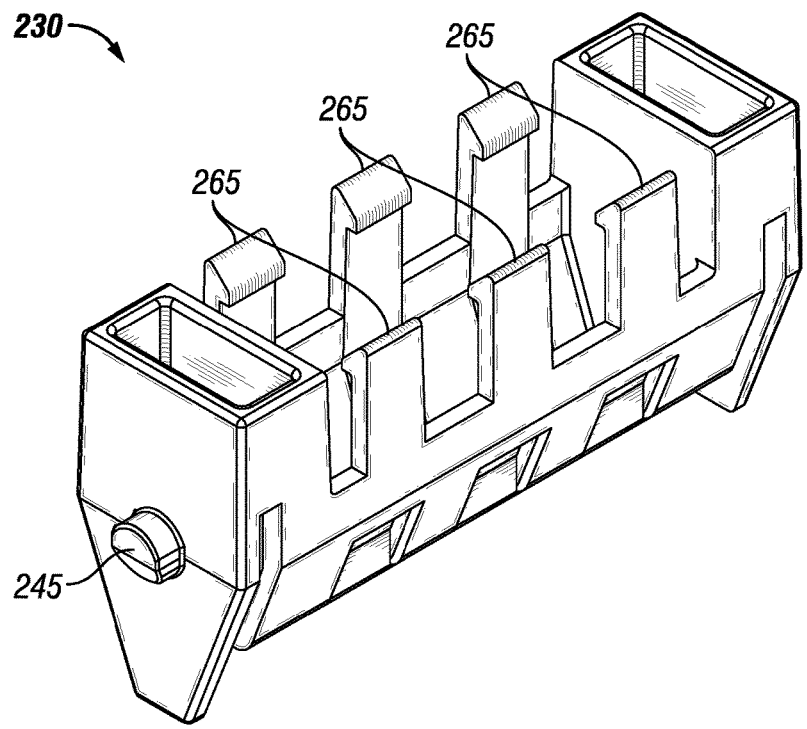
FIGS. 3A, 3B, 3C, 3D, and 3E (collectively FIG. 3) illustrate an example rotatable connector channel that may be incorporated in a wiring box according to some embodiments of the disclosure.
Figure 3B:
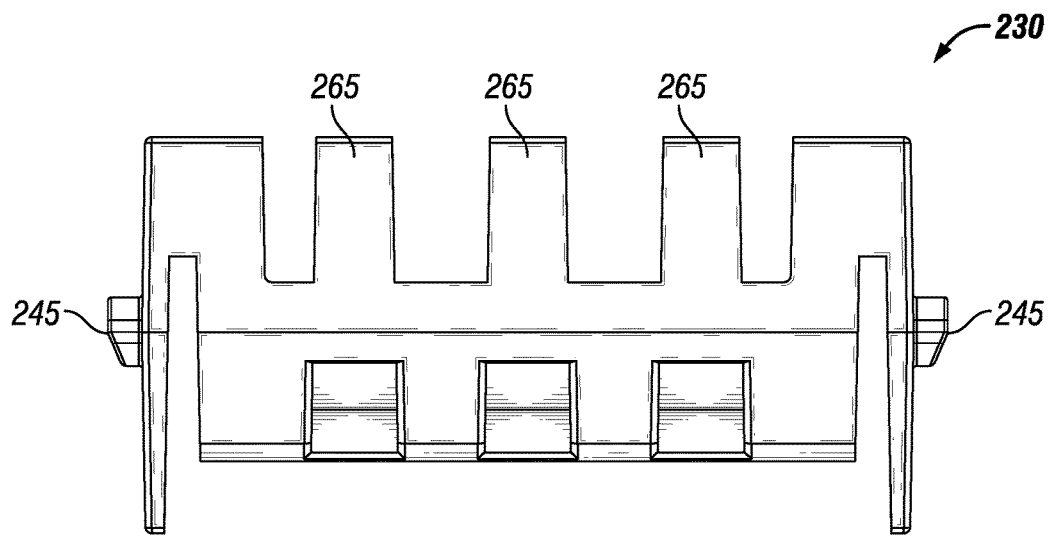
Figure 3E:
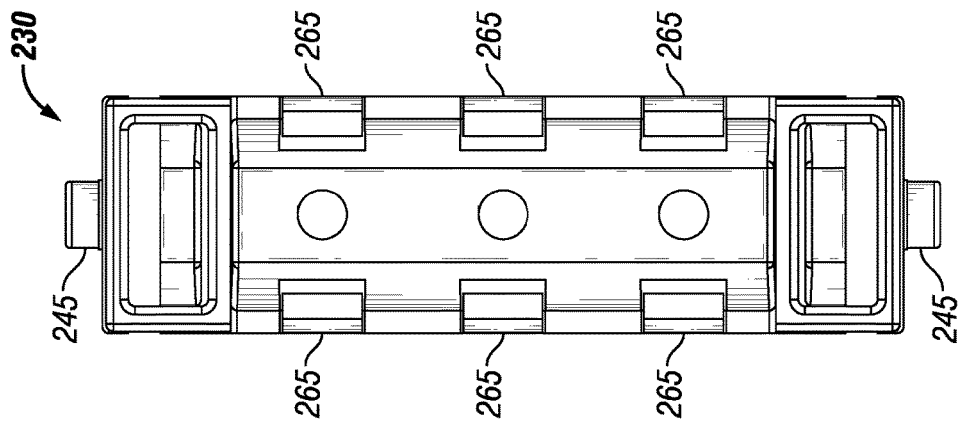
Figure 3D:
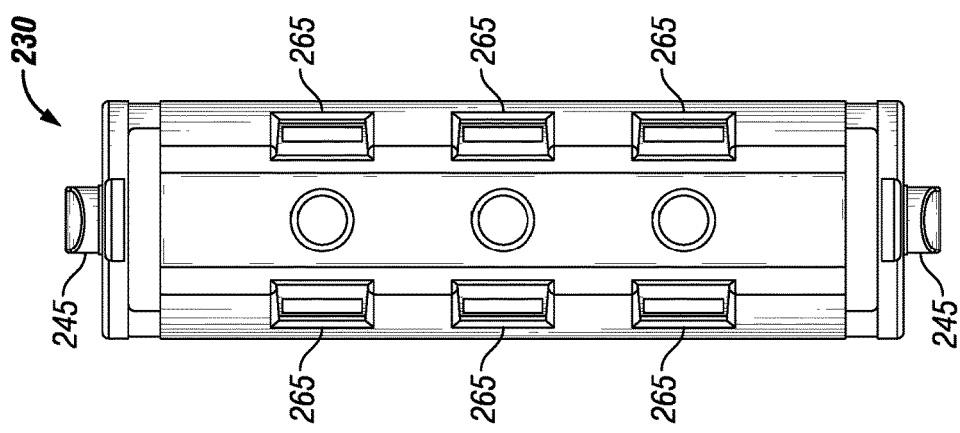
Figure 3C:
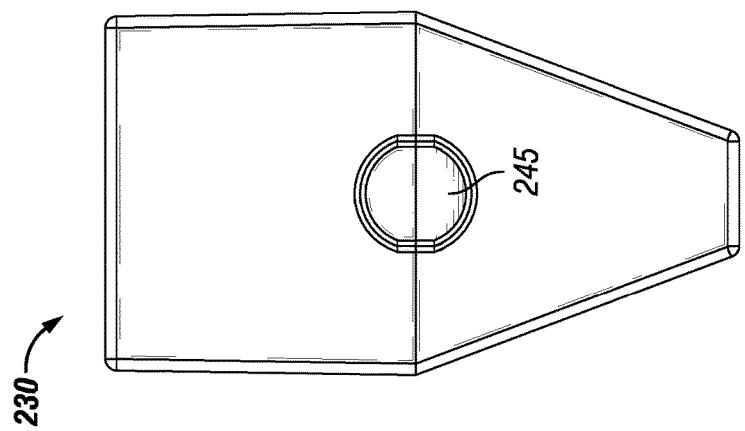

Once the connections are secure, the worker typically rotates the rotatable connector assembly 230 to the orientation of FIG. 2F, so that the input electrical wiring extends along the floor 247 of the wiring box 100 (and along the cover 205 once the cover 205 is closed). Thus, the wiring connectors 235 can face away from the opening 207 and towards a sidewall 211. The installer may manually make the rotation after mounting the luminaire, for example. In an example embodiment, the rotatable connector assembly 230 may be rotated approximately 90 degrees (or some other appropriate angle) between the configurations of FIGS. 2E and 2F.

Once the worker has rotated the rotatable connector assembly 230 into the orientation of FIG. 2F, the input electrical wiring 255 extends within the wiring box 100 to a wiring clamp 210 that is situated in a notch 212 in a sidewall 211 of the wiring box 100, specifically where the cover 205 of the wiring box 100 meets the sidewall 211. The illustrated wiring claim 210 can thus clamp and secure the input electrical wiring 255. A representative embodiment of the wiring clamp 210 that may be utilized is disclosed in U.S. Pat. No. 7,922,020 that issued on Apr. 12, 2011 in the name of Grzegorz Wronski and is entitled "Apparatus for Securing a Line such as a Cable."

In the orientation of FIG. 2F, the cover 205 of the wiring box 100 is readily closed. Accordingly, the worker can conveniently and efficiently place the luminaire 125 in an operational state as illustrated in FIG. 1 and discussed above. At some future time, perhaps years later, a worker seeking to service the system 100 can similarly access the luminaire wiring.

Turning now to FIGS. 3, 4, 5, and 6, an example embodiment of the rotatable connector assembly 225 will be discussed in further detail.

FIG. 3 provides illustrations of multiple views of a rotatable connector channel 230 that may be incorporated in the rotatable connector assembly 225 and further incorporated in the wiring box 100 in accordance with some example embodiments of the disclosure. FIG. 3A illustrates a perspective view of the rotatable connector channel 230. FIG. 3B illustrates a side view of the rotatable connector channel 230. FIG. 3C illustrates an end-on view of the rotatable connector channel 230. FIG. 3D illustrates a bottom view of the rotatable connector channel 230. FIG. 3E illustrates a top view of the rotatable connector channel 230.

Figure 4:
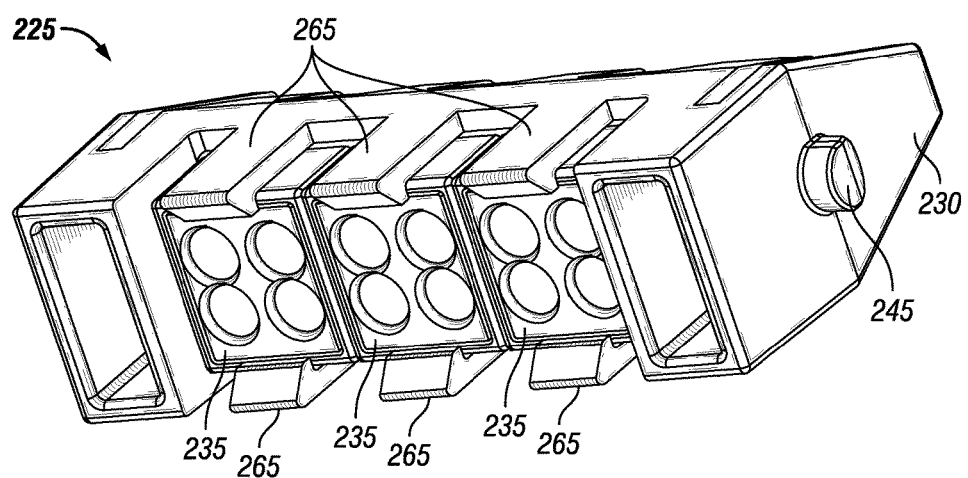
FIG. 4 illustrates an example rotatable connector assembly that may be incorporated in a wiring box, according to some embodiments of the disclosure.
Figure 5:
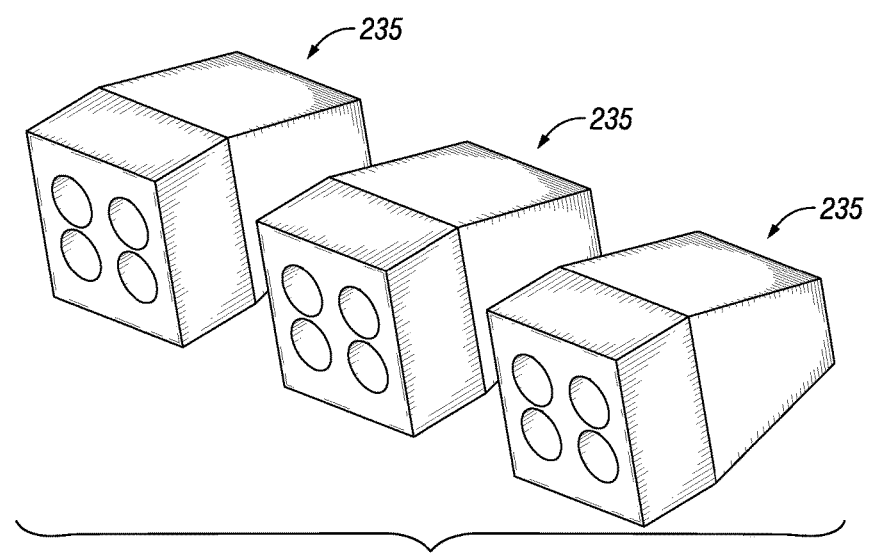
FIG. 5 illustrates an example connector array that may be incorporated in a rotatable connector assembly, according to some embodiments of the disclosure.
Figure 6:
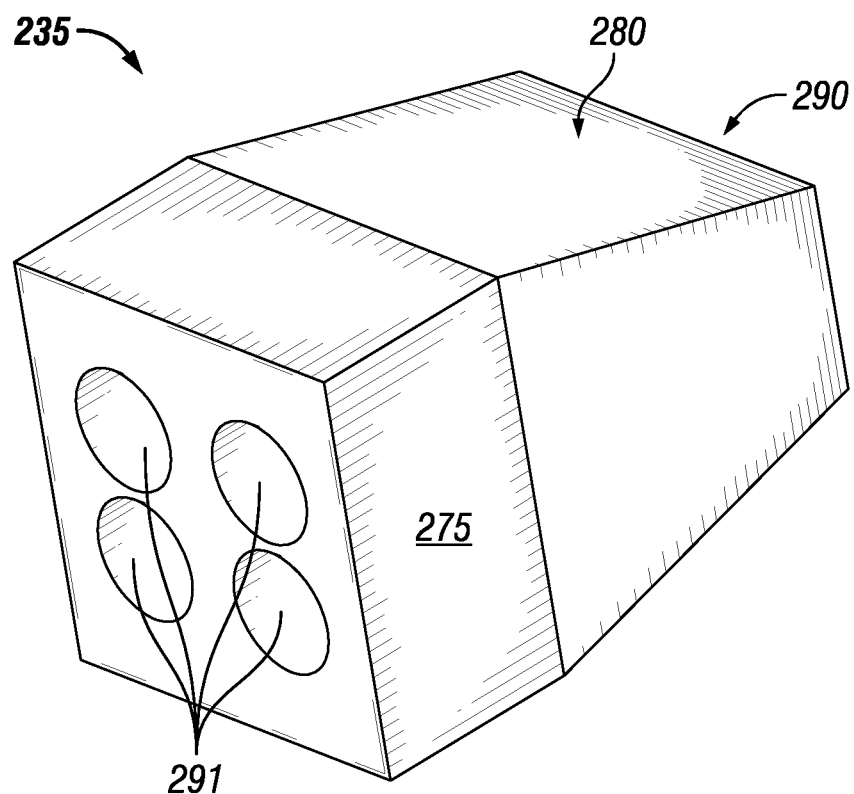
FIG. 6 illustrates an example connector that may be incorporated in an example connector array of a rotatable connector assembly, according to some embodiments of the disclosure.

FIG. 4 is an illustration of the rotatable connector assembly 225 that may be incorporated in the wiring box 100, in accordance with some example embodiments of the disclosure. FIG. 5 is an illustration of an array of the wiring connectors 235 that may be incorporated in the rotatable connector assembly 225, in accordance with some example embodiments of the disclosure. FIG. 6 is an illustration the wiring connector 235 that may be incorporated in a connector array of a rotatable connector assembly 225, in accordance with some example embodiments of the disclosure.

As best seen in FIG. 3, the rotatable connector channel 230 comprises two protrusions extending from opposing ends of the rotatable connector channel 230 to form pivots 245. As illustrated in FIG. 2, when the rotatable connector channel 230 is installed in the wiring box 100, the pivots 245 extend through respective apertures 250 in the sidewalls 295 in the wiring box 100. The pivots 245 are thus aligned to the axis of rotation 240 and create an axle about which the rotatable connector assembly 225 rotates as discussed above.

As best seen in FIG. 4, the illustrated rotatable connector channel 230 comprises retention fingers 265 or prongs for retaining the wiring connectors 235, which are illustrated in an array in FIG. 5 and as a single wiring connector 235 in FIG. 6. Each connector 235 is readily inserted in the rotatable connector channel 230. When inserted, the retention fingers 265 spring closed to retain the wiring connectors 235. In an example embodiment, the rotatable connector channel 230 is formed from a thermoplastic such as nylon that springs back following deformation. Accordingly, the retention fingers 265 bend open to accept the wiring connectors 235 and then close for retention. In an example embodiment, the array of wiring connectors 235 illustrated in FIG. 5 is color coded according to ground, hot, and neutral for inclusion in the rotatable connector assembly 225.

As best seen in FIG. 6, in the illustrated embodiment, each example wiring connector 290 comprises at least two front wiring apertures 291 that are electrically connected to one another. The body 275 of the example wiring connector 290 can be formed of an insulating plastic material so that flow of electricity through the connector body 275 is insulated. As illustrated, the example wiring connector 235 has a tapered rear body 280 that facilitates insertion in the rotatable connector channel 230 as discussed above.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system comprising:
 a wiring box that is disposed adjacent a housing and that comprises:
  a base;
  a plurality of sidewalls extending from the base;
  an opening opposite the base; and
  a cover that opens and shuts to cover said opening; and
 an array of wiring connectors that is mounted in the wiring box, that extends lengthwise along an axis, and that is rotatable about the axis,
 wherein each of the wiring connectors comprises an aperture sized for receiving a wire, and
 wherein the array of wiring connectors is rotatable so that each of the apertures has at least a first rotational orientation in which each of the apertures faces one of the sidewalls and a second rotational orientation in which each of the apertures faces the opening.

2. The system of claim 1, further comprising a lighting fixture, wherein the wiring box is attached to a side of the lighting fixture.

3. The system of claim 1, wherein the cover opens and shuts by rotation about a second axis that is substantially parallel to the axis.

4. The system of claim 1, wherein the cover opens and shuts by rotation about a second axis that extends alongside the axis.

5. The system of claim 1, wherein the axis extends between two sidewalls in the plurality of sidewalls.

6. The system of claim 1, wherein the one of the sidewalls comprises a slot that is sized and disposed for passing a wire having an end in one of the apertures.

7. A system comprising:
a wiring box that comprises:
  a base;
  an opening opposite the base;
  sidewalls extending between the base and the opening; and
  a cover that extends over the opening; and
an array of wiring connectors that is mounted in the wiring box and that rotates between a first orientation when the cover is closed and a second orientation when the cover is open, each of the wiring connectors comprising an aperture sized for receiving a wire,
wherein in the first orientation, each of the apertures is oriented towards one of the sidewalls, and
wherein in the second orientation, each of the apertures is oriented towards the opening.

8. The system of claim 7, wherein the one of the sidewalls comprises a slot that is oriented for passage of a wire having an end disposed in one of the apertures.

9. The system of claim 7, wherein the cover rotates about a first axis to open and shut, and
wherein the array of wiring connectors rotates about a second axis that is substantially parallel to the first axis.

10. The system of claim 7, wherein the cover rotates about a first axis, and
wherein the array of wiring connectors rotates about a second axis that extends alongside the first axis.

11. The system of claim 7, wherein in the first orientation, each of the apertures is oriented to receive a respective end of a respective wire extending along the base.

12. The system of claim 7, wherein the array of connectors comprises a terminal block.

13. The system of claim 7, further comprising a luminaire, wherein the wiring box extends from a side of the luminaire.

14. The system of claim 7, wherein in the first orientation, at least one of the apertures is aligned with a slot that is formed in the one of the sidewalls adjacent the opening.

15. The system of claim 7, wherein the array of wiring connectors is rotatable independently of opening or shutting the cover.

16. A wiring box comprising:
an enclosure comprising:
  a base; and
  sidewalls that extend from the base to form an opening; and
a connector that comprises an aperture sized to receive an end of a wire, that is rotatably mounted inside the enclosure, and that has a first and a second rotational orientation,
wherein in the first rotational orientation, the aperture faces the opening to offer direct access to the connector, and
wherein in the second rotational orientation, the aperture faces one of the sidewalls to facilitate covering the opening when the end of the wire is disposed in the aperture.

17. The wiring box of claim 16, wherein the one of the sidewalls comprises a slot that is sized and disposed to pass the wire when the end of the wire is disposed in the aperture.

18. The wiring box of claim 16, wherein the enclosure further comprises a cover that covers the opening and that rotates about a first axis,
wherein the connector rotates about a second axis, and
wherein the first axis and the second axis extend alongside one another.

19. The wiring box of claim 16, wherein the enclosure is attached to a lighting fixture.

20. The wiring box of claim 16, wherein the connector comprises an array of connectors that are rotatably mounted inside the enclosure.

* * * * *